UNITED STATES PATENT OFFICE.

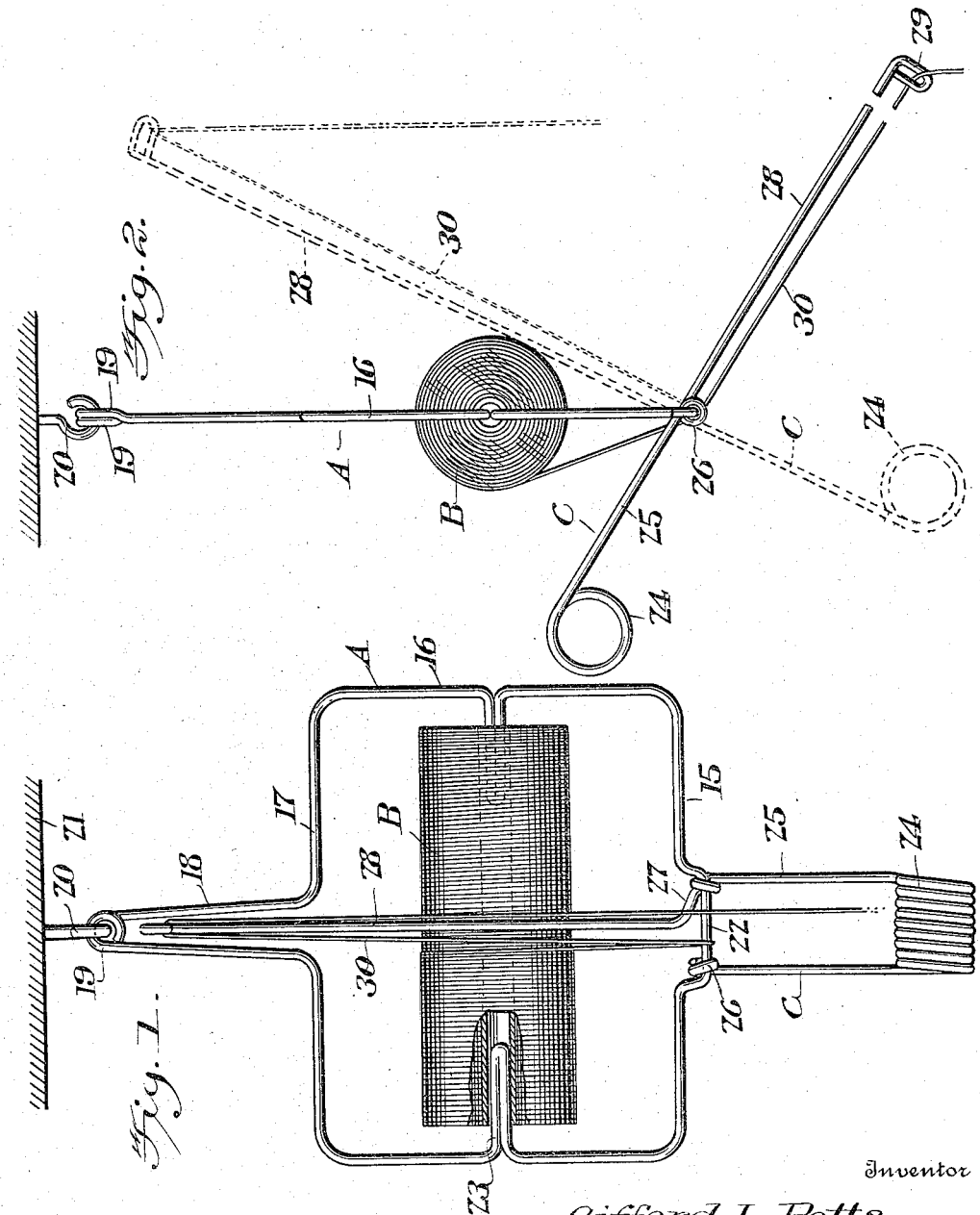

GIFFORD L. POTTS, OF ELKTON, MARYLAND.

TWINE-HOLDER.

1,173,030.        Specification of Letters Patent.       Patented Feb. 22, 1916.

Application filed May 5, 1915. Serial No. 26,112.

*To all whom it may concern:*

Be it known that I, GIFFORD L. POTTS, a citizen of the United States, residing at Elkton, in the county of Cecil and State of Maryland, have invented new and useful Improvements in Twine-Holders, of which the following is a specification.

This invention relates to twine holders, and it has for its object to produce a twine holder of very simple and improved construction which may be formed of wire at a very small expense.

A further object of the invention is to produce a wire twine holder consisting of a frame, the side members of which are provided with spool engaging devices to engage a tubular spool or bobbin, said side members being capable of being spread apart for the removal or replacement of a spool, and adapted to be connected together in such a manner that the displacement of the spool will be positively prevented.

A further object of the invention is to produce a wire twine holder having a counterbalanced twine guide, also formed of wire in a very simple and inexpensive manner.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing, Figure 1 is a front view of a twine holder constructed in accordance with the invention. Fig. 2 is a side elevation of the same with dotted lines indicating the twine holder at rest and with full lines showing the twine holder as it appears when twine is drawn from the spool or bobbin.

Corresponding parts in both figures of the drawing are denoted by like characters of reference.

The frame A of the improved twine holder is formed of a single piece of wire of suitable gage by bending the same to form a bottom member 15, side members 16 and a top member composed of arms 17 extending laterally from the side members, each of said arms having an upward extension 18 formed with a terminal eye 19, said eyes being slightly offset in opposite directions so as to be capable of being conveniently overlapped, as clearly seen in Fig. 2. When thus overlapped, the eyes 19 form means for suspending the frame from a hook 20 which may be screwed into the ceiling 21 or into a suitable overlapped support. When the eyes 19 are assembled with the hook 20, the latter will obviously obstruct the spreading apart of said eyes.

The bottom member 15 of the frame is provided intermediate its ends with a downwardly offset portion 22. Each side member 16 is bent or doubled on itself about midway between its upper and lower ends so as to form an inwardly extending spindle 23. These spindles, which extend in the direction of each other and in substantial alinement with each other, serve to support the spool or bobbin B. It is obvious that by detaching one or both of the eyes 19 from the supporting hook 20, the side members of the frame may be spread apart to provide for the removal or insertion of a bobbin of twine.

The downwardly offset portion 22 of the bottom member 15 of the frame A serves to support a twine guide which consists of an approximately U-shaped yoke C, the bridge piece of which consists of a spiral coil 24 of sufficient size and weight to form a balance weight. The limbs 25 of the yoke C are provided with eyes 26 pivotally engaging the offset portion 22, and one of said limbs is offset laterally, as seen at 27, and extended upwardly to form an arm 28 having a terminal eye 29 through which the string or twine passing from the spool is threaded.

When the device is at rest, the twine guide will occupy the position indicated in dotted lines in Fig. 2, by reference to which it will be seen that the arm 28, being overbalanced by the counterweight consisting of the coil 24, will be moved in an upward direction, thereby suspending the free end of the twine in an elevated position. When twine is to be used, the suspended end is grasped by the operator who by pulling downward thereon causes the twine guide to assume the position shown in Fig. 2. After using the desired portion and severing the twine, the free end will be restored to its elevated position, as seen in dotted lines.

The improved twine holder, as will be seen from the foregoing description, is extremely simple in construction, and the material being very inexpensive, it may be very cheaply produced. By the use of this device a spool of twine may be kept in convenient position for use, and entanglement of the twine as it is being removed from the spool or bobbin will be prevented.

Having thus described the invention, what is claimed as new, is:—

In a twine holding device, a substantially rectangular frame formed of wire and having a bottom member provided with a downwardly offset portion, in combination with a twine guide pivoted on said offset portion, said guide comprising an approximately U-shaped yoke having a bridge piece formed of a spiral coil, limbs provided with eyes engaging the offset portion of the frame, and an arm extending from one of the limbs and having a terminal eye.

In testimony whereof I affix my signature in presence of two witnesses.

GIFFORD L. POTTS.

Witnesses:
DANIEL H. GARRETT,
RALPH D. MORGAN.

Copies of this patent may be obtained for five cents each, by addressing the "Commissioner of Patents, Washington, D. C."